May 11, 1965 W. W. THOM 3,182,963
SPLIT POST RAILING ASSEMBLY
Filed Feb. 12, 1962 2 Sheets-Sheet 1

INVENTOR.
Wenzel W. Thom
BY
Hovey, Schmidt, Johnson & Hovey
ATTORNEYS.

May 11, 1965   W. W. THOM   3,182,963
SPLIT POST RAILING ASSEMBLY
Filed Feb. 12, 1962   2 Sheets-Sheet 2
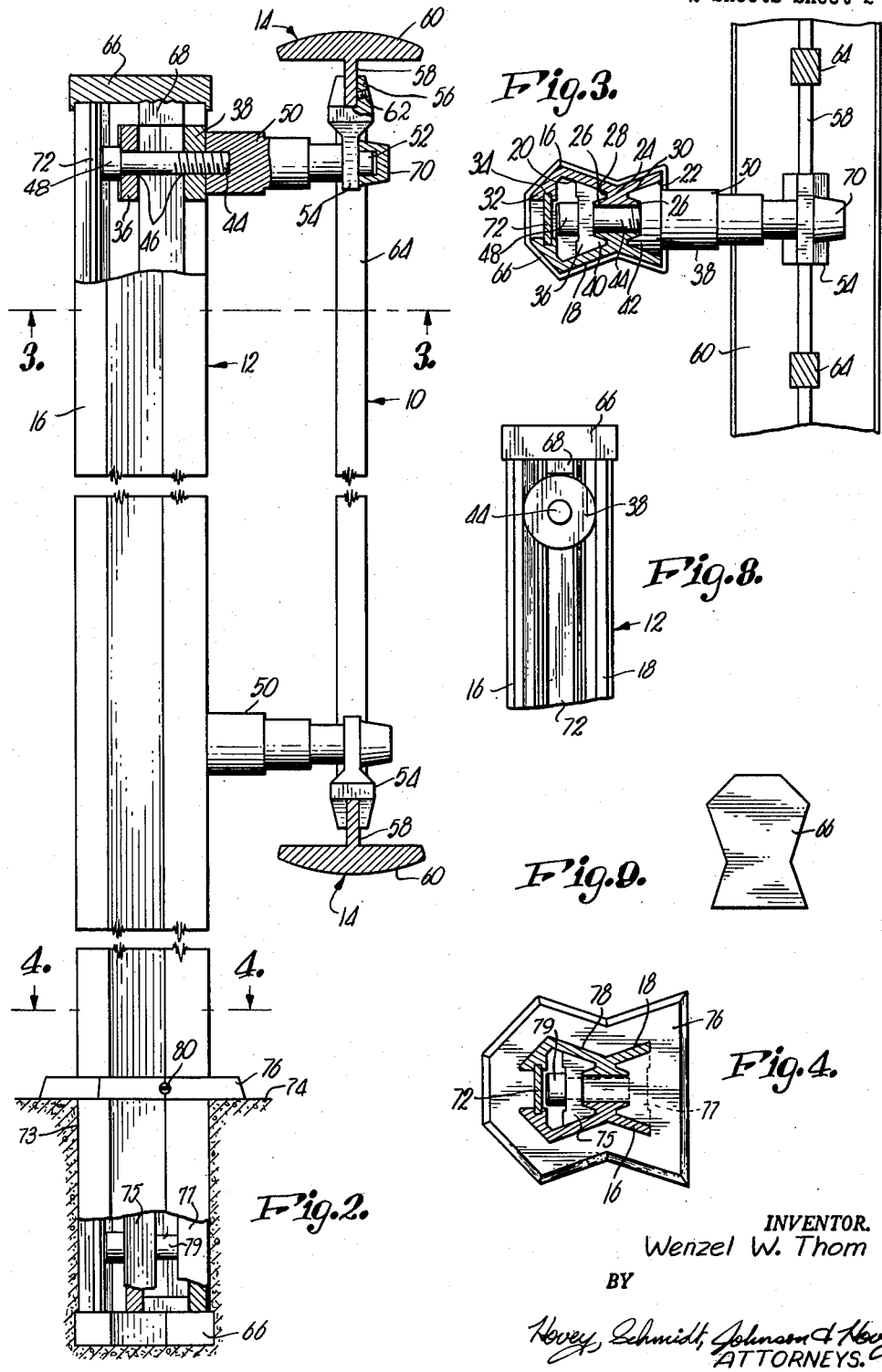
INVENTOR.
Wenzel W. Thom
BY
Hovey, Schmidt, Johnson & Hovey
ATTORNEYS.

United States Patent Office 3,182,963
Patented May 11, 1965

3,182,963
SPLIT POST RAILING ASSEMBLY
Wenzel W. Thom, Wichita, Kans., assignor of one-half to Cecil D. Jones, Wichita, Kans.
Filed Feb. 12, 1962, Ser. No. 172,422
5 Claims. (Cl. 256—65)

This invention relates to railing structure suitable for use as a safety device, partitioning means, or ornamentation for a structure.

Heretofore it has been the practice to precut, predrill and fabricate the various parts of railing structure at the fabricator's plant before the structure is disassembled and taken to the installation site and positioned in place upon refabrication thereof. Although such a practice is in many instances satisfactory, it is extremely expensive and provides no compensation for constructional errors and irregularties that may occur in the structural surfaces to which the railing structure is to be attached. The railing structure is thus required to be altered at the installation site before the same may be installed, such alteration sometimes necessitating substitution of new components and redrilling of holes and recutting of various parts thereof.

Railing assemblies have been provided in recent years which obviate the necessity of assembling the railing unit at the fabricator's plant followed by disassembly of the same for shipment, but these railings have not heretofore embodied adequate means for permitting relative adjustment of the different parts thereof to compensate for irregularities in the surfaces on which the railing assemblies are to be mounted.

The present invention overcomes the disadvantages mentioned above by providing novel railing structure having means thereon permitting relative adjustments of the various components to be easily and quickly made so that physical alteration of the railing structure need not be made at the installation site to compensate for irregularities or errors in the surface on which the railing assembly is to be attached.

It is, therefore, the primary object of the present invention to provide a railing assembly which may be utilized as a safety device, as a partitioning member, or as a unit for enhancing the aesthetic appearance of a structure, and which is constructed of novel components permitting the same to be adjusted to a substantially infinite number of positions in different directions whereby the relative relationship of the parts of the railing assembly may be altered as required to compensate for errors of construction of the structure without changing the original design specifications of the railing assembly at the installation site.

Another object of the present invention is the provision of a railing assembly of wide utility in view of the fact that the assembly is formed of readily interchangeable and replaceable parts, so that the assembly may be added to or subtracted from, either to conform to standards of safety, or to vary the ornamental characteristics of the assembly.

Still a further object of the present invention is the provision of a railing assembly of the type described which is of a construction permitting the shiftable parts thereof to be easily adjusted, interchanged or replaced without requiring special tools or special skill on the part of individuals effecting the changes thereon.

Yet another object of the present invention is the provision of a railing assembly wherein the major parts thereof may be constructed by conventional extrusion processes thereby materially decreasing the cost of the assembly, the fabrication time thereof and permitting the external appearances of the extruded parts to be altered to provide a large inventory of replacements, each having a different external appearance while still retaining the structure common to all of the parts and required for interconnecting the latter to form said assembly.

Another significant object of the invention is to provide a railing assembly having a number of upright posts serving to support one or more hand or safety rails and wherein the vertical disposition of the rails with respect to the posts is fully adjustable by virtue of the utilization of split post construction with the brackets for the rails being clamped between the split portions of the post and thereby allowing the railing brackets to be located at any desired location longitudinally of each post. In this respect, another important object of the invention is to provide a railing assembly as described wherein the bracket units for mounting the rails on the posts are of novel configuration permitting utilization of the same as coupling means for releasably interconnecting the split portions of the posts thereby simplifying the fabrication of the railing assembly and decreasing the inventory of parts required.

Other objects of the present invention will become apparent as the following specification progresses, reference being had to the accompanying drawings, wherein:

FIG. 2 is an enlarged, end elevational view of a post and a pair of rails mounted thereon made pursuant to the present invention and illustrating one manner of mounting the post on a supporting structure, parts being broken away and in section to illustrate details of construction;

FIG. 3 is a view of the post and one of the rails taken along line 3—3 of FIG. 2;

FIG. 4 is a view of the post taken along line 4—4 of FIG. 2;

FIG. 8 is a fragmentary view of the upper end of the post illustrated in FIG. 2 with the means for interconnecting the rail thereto removed therefrom;

FIG. 9 is a plan view of the cap utilized for closing the upper end of the post shown in FIG. 2.

Figure 1:
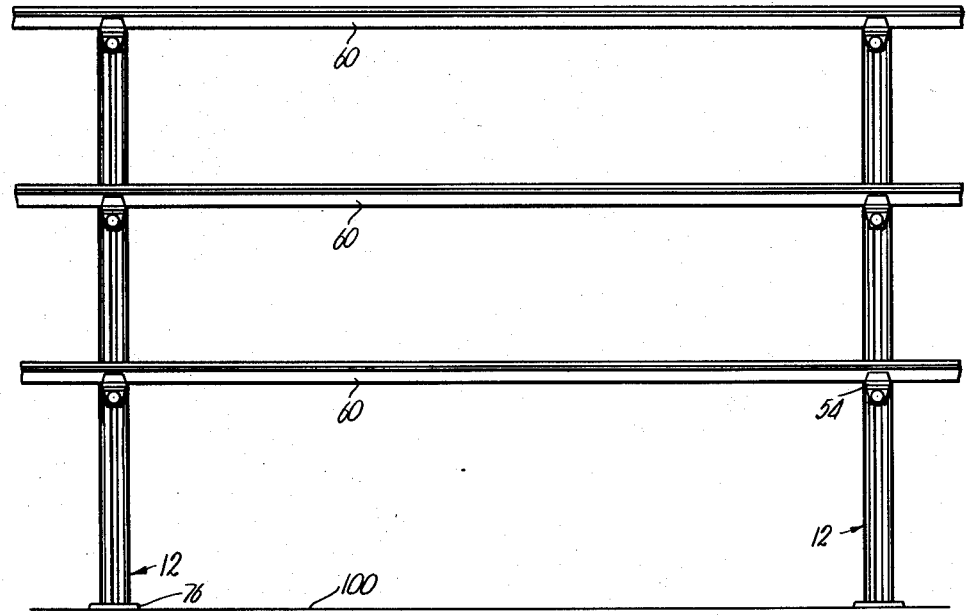
FIGURE 1 is an elevational view of a railing assembly comprised of a pair of spaced, generally upright posts mounted on a supporting structure and having a number of vertically spaced rails thereon providing either a safety device or partitioning means for the support structure therebelow.

The present invention provides a railing assembly which includes a generally upright post adapted to be secured to a supporting surface, and further includes railing structure in the form of an elongated rail utilized with the post to provide a safety device, partitioning means or a decorative member to enhance the aesthetic appearance of the region at which the railing assembly is utilized. An elongated coupling device interconnects the post and the rail and permits the latter to be shifted along the length of the post into any one of a number of fixed positions. In addition, the rail is swingably mounted on the coupling device to permit variations in inclination of the rail to adapt it for use in a number of applications. The coupling device may be provided with means permitting the same to be telescoped axially so that the rail may be moved laterally of the post.

The post is formed from a pair of elongated, interchangeable members having groove means thereon for receiving clamping elements forming parts of the coupling device. The post may be mounted uprightly on a supporting surface by rigidly securing the lower end of the post to the surface, or the post may be rigidly secured to the side of a structure such as the end wall of the riser of a staircase. In the latter case, the post may be longitudinally adjustable.

The post members, as well as the rail, are generally formed from extrusions so that the external appearances of the members and rail may be controlled to thereby vary the ornamental characteristics thereof.

A railing assembly 10 is illustrated in FIGS. 2 and 3 and includes a generally upright post 12 and railing structure broadly numerated 14. In the embodiment illustrated in FIG. 2, assembly 10 includes a pair of structures 14 in vertically spaced relationship, the lower of the structures 14 being inverted with respect to the structure 14 thereabove.

Post 12 includes a pair of elongated members 16 and 18 illustrated in transverse cross section in FIG. 3. Members 16 and 18 are substantially identical in all respects and therefore, are interchangeable. Members 16 and 18 may be formed from a material capable of being extruded, such as aluminum or the like, to reduce the cost of manufacturing of post 12, while assuring that the ornamental characteristics thereof are maintained. To this end, each member 16 and 18 may be cut from the same strip of extruded material to thereby assure that the external appearance of each member 16 and 18 is the same.

Each member 16 or 18 is provided with a pair of normally innermost, converging surfaces 20 and 22 joined at a boss 24 extending outwardly from the corresponding member. Boss 24 is provided with a pair of elongated, oppositely directed flanges 26 which are in spaced relationship to surfaces 20 and 22 respectively. Flanges 26 are provided with surfaces which face surfaces 20 and 22 respectively, and which converge as boss 24 is approached. Surfaces 20 and 22 and flanges 26 therefore, present a pair of substantially V-shaped grooves 28 and 30.

Each member 16 or 18 is provided with an elongated boss 32 in spaced relationship to surface 20. A groove 34 runs the length of boss 32 and is thus parallel with grooves 28 and 30.

A pair of identical clamping elements 36 and 38 are utilized for clamping members 16 and 18 together in the positions illustrated in FIG. 3. Elements 36 and 38 are provided with elongated, V-shaped projections 40 and 42 respectively which are complementally received within grooves 28 and 30 formed in members 16 and 18. A machine screw 44 passes through a central opening 46 in each of elements 36 and 38 and projects laterally from element 38 in the manner illustrated in FIG. 2. The head 48 of screw 44 engages the outermost face of element 36 adjacent bosses 32 of members 16 and 18. Screw 44 is threadably mounted in one end of a generally cylindrical coupling device 50 extending laterally from post 12 as shown in FIG. 2. A machine screw 52 is threadably mounted in the opposite end of device 50 to maintain a rail clamp 54 in a fixed position on device 50. Clamp 54 is provided with an opening through which screw 52 passes, the diameter of the opening being slightly greater than the diameter of screw 52 to thereby permit clamp 54 to be rotatable about the axis of screw 52.

Clamp 54 is provided with a bifurcated end 56 in spaced relationship to the opening therein receiving screw 52. End 56 receives the web 58 extending laterally from a rail 60 forming railing structure 14. One or more setscrews 62 through end 56, bear against web 58 to maintain the latter in a fixed position.

Although means have been described for interconnecting the uppermost structure 14 to post 12, it is clear that lowermost structure 14, including a rail 60 having a web 58 thereon, is connected to post 12 by means of a coupling device 50 and a rail clamp 54 in the same manner as set forth hereinabove. In addition, a pair of clamping elements 36 and 38 are provided for securing device 50 to members 16 and 18.

In order to enhance the ornamental characteristics of railing assembly 10, a number of spaced, elongated, transversely polygonal rods 64, having bifurcated ends may be positioned to extend between and receive webs 58 of the upper and lower railing structure 14. It is obvious that the rods 64 may be of different configurations to permit alteration of the appearance of the railing assembly.

A cap 66 covers the uppermost end of post 12, cap 66 being illustrated in FIG. 9 as conforming to the outer shape of members 16 and 18. A central projection 68 integral with cap 66, extends inwardly between members 16 and 18 and a suitable fastening device, such as a setscrew or the like, passes through one of the members 16 or 18 and bears against projection 68 to hold the latter in place between members 16 and 18.

A cap 70 surrounds the head of screw 52 to conceal the latter. A setscrew may be carried by cap 70 and engageable with the head of screw 52 to maintain cap 70 in place over the latter.

An elongated strip 72 is received within grooves 34 of bosses 32 on members 16 and 18. Strip 72 runs substantially the entire length of post 12 to close the corresponding end of the latter and furthermore, to enhance the ornamental characteristics thereof.

Grooves 28 and 30 extend the length of members 16 and 18 so that elements 36 and 38 may be positioned at any location along the length of post 12. Thus, rail 60 may be located in any longitudinal position with respect to post 12. Furthermore, the inclination of rail 60 may be adjusted by swinging the corresponding rail clamp 54 about the longitudinal axis of device 50, which axis is transverse to the longitudinal axis of post 12. Rail 60 may be moved longitudinally within the bifurcation of rail clamp 54 by loosening screw 56 out of engagement with web 58. Rail 60 is thus capable of moving in a vertical direction when post 12 is disposed uprightly. Rail 60 is also shiftable longitudinally of its own length and rotatable about screw 52. By virtue of the aforesaid construction, rail 60 may be adjusted when assembly 10 is installed in an operative position to thereby compensate for errors of construction of the structural unit to which assembly 10 is attached. It is also contemplated that clamp 54 may be wider than shown, if desired, to present means serving as a splice unit for connecting opposed ends of adjacent rails 60.

In FIG. 2, post 12 is shown mounted uprightly on a structural unit 74 such as the floor of a building. To accomplish the mounting of post 12, a hole 73 is formed in structural unit 74 below the uppermost surface thereof and members 16 and 18 are placed within the hole prior to the pouring of a binding agent in the hole around the members. For instance, molten lead or any cementitious material may be utilized for securing post 12 to unit 74.

The lower ends of members 16 and 18 are clamped together by a pair of elongated clamping elements 75 and 77 provided with projections thereon similar to projections 40 and 42 on elements 36 and 38 and receivable within grooves 28 and 30 respectively. A pair of machine screws 79 interconnect elements 75 and 77 and are threadably received within element 77. The lengths of elements 75 and 77 are preferably equivalent to the depth of the hole in unit 74 for receiving post 12. Also, a cap 66 may be placed over the lower end of post 12 if desired.

A floor plate 76, having a central opening 78 conforming to the external configurations of members 16 and 18, surrounds post 12 and engages the upper surface of structural unit 74 as is clear in FIG. 2. A setscrew 80 passes through plate 76 and bears against member 16 to affix plate 76 to post 12. Plate 76 thereby gives a finished and workman-like appearance to the mounting means for assembly 10. As shown in FIG. 4, opening 78 permits strip 72 to traverse the entire lengths of members 16 and 18. Opening 78 is of a configuration also to conceal clamping element 77 below the uppermost surface of structural unit 74.

Figure 6:
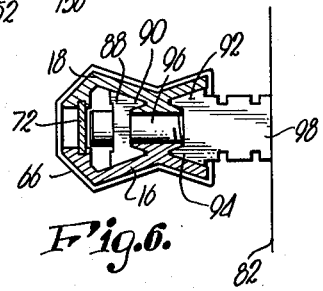
FIG. 6 is a cross-sectional view of the post taken along line 6—6 of FIG. 5.
Figure 7:
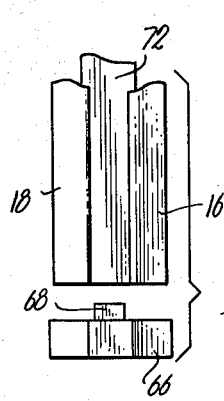
FIG. 7 is a view of the lower end of the post illustrated in FIG. 5 and showing a cap for closing the lower end thereof.
Figure 5:
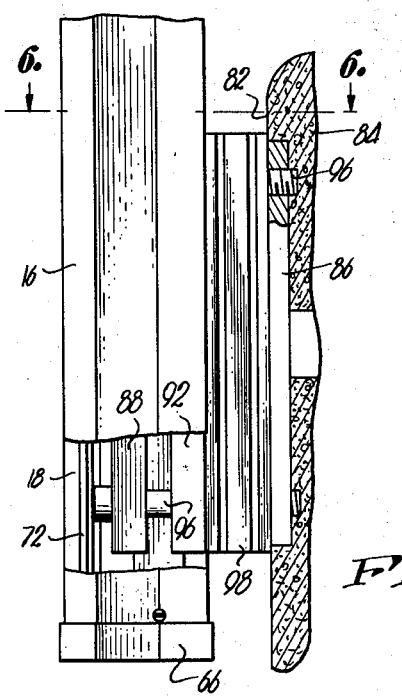
FIG. 5 is an enlarged, fragmentary view of the lower end of a post and illustrating a second manner of mounting the post on a supporting structure.

An alternate method of mounting post 12 is illustrated in FIG. 5 which shows post 12 secured to the side 82 of a structural unit 84, such as a stair riser or the like. Side 82 may well be the end wall of the stair riser. A mounting plate 86 is initially embedded in structural unit 84 in a manner so that the outer face of plate 86 is flush with the outer surface of side 82. An elongated clamping element 88, having projections 90 thereon, is disposed between members 16 and 18 so that projections 90 are received within grooves 28 of members 16 and 18 as illustrated in FIG. 6.

A clamping element 92 is provided with projections 94 thereon receivable within grooves 30 of members 16 and 18. A pair of machine screws 96 pass through aligned openings in elements 88 and 92 and are threadably received within spaced, threaded openings in plate 86 in the manner illustrated in FIG. 5. It is clear that clamping element 92 has an extension 98 which spans the distance between post 12 and side 82. Extension 98 is integral with the portion of clamping element 92 receivable within grooves 30 of members 16 and 18.

A cap 66 covers the lower end of post 12 which is spaced above a supporting surface upon which structural unit 84 rests. It is clear, therefore, that post 12 is adjustable with respect to structural unit 84 by proper manipulation of machine screws 96.

FIGURE 1 illustrates another application of railing assembly 10 to provide a safety device or partitioning means for a zone above a supporting surface 100. A pair of spaced posts 12 are mounted uprightly on surface 100 and are embedded within the latter in the manner illustrated in FIG. 2. A number of vertically spaced, parallel rails 60 is carried by posts 12 in the manner illustrated in FIGS. 2 and 3.

Since members 16 and 18 and rails 60 are formed from lengths of extruded material, the external configurations thereof may be controlled. Thus, these elements may be replaced with similar elements having differing external characteristics provided the basic structure utilized for interconnecting the elements, is retained. For instance, members 16 and 18 may have any shape, provided the same are formed with grooves 28 and 30 therein. Likewise, rail 60 may be of any configuration, provided the same retains web 58 thereon.

Device 50 may have any external appearance, and strips 72 may be multi-colored to provide additional versatility in the ornamental arrangement of railing assembly 10.

It is to be emphasized that members 16 and 18, elements 36 and 38, devices 50, clamps 54 and rails 60 are all interchangeable. In addition, upper and lower caps 66 may be placed at either end of post 12.

The installation and removal of railing assembly 10 may be carried out by individuals having no special skill in the use of tools. Since the various parts of assembly 10 are interchangeable or replaceable, the ornamental characteristics thereof may be altered in a minimum of time and with a minimum expenditure of effort on the part of the individuals effecting the changes thereon.

Figure 10:
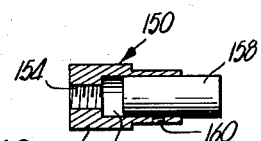
FIG. 10 is a view of a member for interconnecting a post with one of the rails and illustrating means thereon for shifting the rail laterally of the post.

In FIG. 10, a coupling device 150 is illustrated and comprises a first cylindrical section 152 having a threaded bore 154 therein at one end thereof. A bore 156 enlarged with respect to bore 154, is disposed in section 152 at the opposite end thereof. Bore 154 is adapted to receive the threaded end of a machine screw similar to the machine screw 44 for maintaining clamping elements 36 and 38 in position with respect to members 16 and 18.

Device 150 is provided with a second section 158 which is received within bore 156 and held therein by a set-screw 160. Section 158 is preferably provided with a bore therein at the end thereof opposite to the end received within bore 156. Thus, section 158 may be operably coupled with a rail clamp such as clamp 54 described above. By virtue of the construction of FIG. 10, a rail 60 may move laterally of post 12 toward and away from the latter, thus giving rail 60 an additional degree of freedom for adjustment purposes.

Having thus described the invention, what is claimed as new and desired to be secured by Letters Patent is:

1. A railing assembly for a structural unit comprising:
 a post adapted to be mounted in an upright position on said structural unit and including a pair of spaced apart, elongated post members defining a longitudinally extending opening therebetween;
 means releasably interconnecting said post members and movable longitudinally of the latter in said opening to any one of a number of fixed locations with respect thereto;
 a railing member; and
 means releasably coupling said railing member to said interconnecting means independently of the post member interconnecting action thereof.

2. A railing assembly for a structural unit comprising:
 a post adapted to be mounted in an upright position on said structural unit and including a pair of spaced apart, elongated post members each having a longitudinally extending boss thereon projecting outwardly therefrom toward and being spaced from the corresponding boss of the adjacent post member;
 a pair of elements between said post members and disposed on opposed sides of each of said bosses in spanning relationship to the space therebetween;
 structure releasably interconnecting said elements to thereby releasably secure the same to said post members and to permit said elements to be moved longitudinally of said post members into any one of a number of fixed locations with respect thereto;
 a railing member; and
 means releasably coupling said railing member to one of said elements independently of the element interconnecting action of said structure.

3. A railing assembly as set forth in claim 2, the boss of each of said post members having a pair of opposed flanges presenting with the corresponding post member a pair of oppositely facing grooves, each of said elements being provided with projections thereon receivable within the proximal grooves when said elements are interconnected by said structure.

4. A railing assembly as set forth in claim 2, said structure including screw means extending through said elements, disposed between said bosses and being threadably coupled with one of said elements for interconnecting said elements.

5. A railing assembly as set forth in claim 4, a portion of said screw means projecting outwardly from said post members, said railing member coupling means including a coupling device threadably coupled with said portion of the screw means, and means releasably clamping said railing member to said coupling device.

References Cited by the Examiner
UNITED STATES PATENTS

| | | | |
|---|---|---|---|
| 2,715,017 | 8/55 | Weimer | 256—65 |
| 2,780,440 | 2/57 | Krieger | 256—21 |
| 2,820,613 | 1/58 | Schilling | 256—65 |
| 2,873,094 | 2/59 | Blum | 256—31 |
| 2,905,446 | 9/59 | Blum | 256—65 |
| 2,945,679 | 7/60 | Blum | 256—65 |
| 2,950,787 | 8/60 | Walsh | 189—23 |
| 2,963,275 | 12/60 | Meyers | 256—65 |
| 3,007,678 | 11/61 | Buehler | 256—65 |
| 3,018,077 | 1/62 | Buehler | 256—65 |
| 3,028,148 | 4/62 | Crannell | 256—65 |

HARRISON R. MOSELEY, *Primary Examiner.*

ARNOLD RUEGG, *Examiner.*